United States Patent
Dermer et al.

(10) Patent No.: US 10,684,942 B2
(45) Date of Patent: Jun. 16, 2020

(54) SELECTIVE APPLICATION TESTING

(71) Applicant: ENTIT Software LLC, Sunnyvale, CA (US)

(72) Inventors: Maria Dermer, Yehud (IL); Avi Kabizon, Yehud (IL); Rudy Medarov, Yehud (IL)

(73) Assignee: MICRO FOCUS LLC, Santa Clara, CA (US)

( * ) Notice: Subject to any disclaimer, the term of this patent is extended or adjusted under 35 U.S.C. 154(b) by 0 days.

(21) Appl. No.: 15/749,657

(22) PCT Filed: Aug. 4, 2015

(86) PCT No.: PCT/US2015/043588
§ 371 (c)(1),
(2) Date: Feb. 1, 2018

(87) PCT Pub. No.: WO2017/023300
PCT Pub. Date: Feb. 9, 2017

(65) Prior Publication Data
US 2018/0225195 A1     Aug. 9, 2018

(51) Int. Cl.
*G06F 11/36*     (2006.01)
*G06F 11/263*    (2006.01)
*G06F 11/34*     (2006.01)

(52) U.S. Cl.
CPC ........ *G06F 11/3672* (2013.01); *G06F 11/263* (2013.01); *G06F 11/34* (2013.01); *G06F 11/3688* (2013.01); *G06F 11/3696* (2013.01)

(58) Field of Classification Search
CPC ......... G06F 11/263–2635; G06F 11/34–3438; G06F 11/3452; G06F 11/3668–3696
See application file for complete search history.

(56) References Cited

U.S. PATENT DOCUMENTS

| | | | |
|---|---|---|---|
| 5,943,048 A * | 8/1999 | Nyman | G06F 11/3684 715/808 |
| 7,558,633 B2 | 7/2009 | Bleumer et al. | |
| 7,685,576 B2 * | 3/2010 | Hartmann | G06F 11/3684 717/105 |

(Continued)

FOREIGN PATENT DOCUMENTS

| WO | WO-2012049376 A1 | 4/2012 |
|---|---|---|
| WO | WO-2014117320 | 8/2014 |

OTHER PUBLICATIONS

Sanaa Alsmadi, Generation of Test Cases From Websites User Sessions, 2011, The 5th International Conference on Information Technology, pp. 1-4 (Year: 2011).*

(Continued)

*Primary Examiner* — Ziaul A Chowdhury
*Assistant Examiner* — Zheng Wei (57) ABSTRACT

Examples relate to selectively testing applications. In one example, a computing device may: receive, from a testing device, a current state of an application under test (AUT); select a user action flow from a plurality of user action flows, each user action flow including a plurality of user actions previously performed on the AUT when the AUT was in a prior state that corresponds to the current state; and provide the selected user action flow to the testing device.

19 Claims, 4 Drawing Sheets

(56) References Cited

U.S. PATENT DOCUMENTS

| | | | | |
|---|---|---|---|---|
| 7,917,895 | B2* | 3/2011 | Givoni | G06F 11/3414 |
| | | | | 717/115 |
| 8,001,468 | B2* | 8/2011 | Khaladkar | G06F 11/3684 |
| | | | | 714/37 |
| 8,239,826 | B2* | 8/2012 | Elenburg | G06F 11/3414 |
| | | | | 717/110 |
| 8,271,950 | B2* | 9/2012 | Bharadwaj | G06F 11/3684 |
| | | | | 717/124 |
| 8,392,886 | B2* | 3/2013 | Sweis | G06F 11/3688 |
| | | | | 717/124 |
| 8,904,358 | B1* | 12/2014 | Peri-Glass | G06F 11/3608 |
| | | | | 717/126 |
| 9,032,360 | B1* | 5/2015 | Cohen | G06F 11/3684 |
| | | | | 717/103 |
| 9,189,135 | B2* | 11/2015 | Chaturvedi | G06F 11/368 |
| 9,317,412 | B1* | 4/2016 | Cohen | G06F 11/3688 |
| 9,483,390 | B2* | 11/2016 | Chaturvedi | G06F 11/368 |
| 9,772,932 | B2* | 9/2017 | Duan | G06F 11/3688 |
| 9,934,134 | B2* | 4/2018 | Cohen | G06F 9/44589 |
| 2003/0110243 | A1* | 6/2003 | Soulhi | H04L 41/0893 |
| | | | | 709/223 |
| 2005/0197818 | A1* | 9/2005 | Monfared | G05B 19/042 |
| | | | | 703/21 |
| 2005/0256665 | A1* | 11/2005 | Hartmann | G06F 11/3684 |
| | | | | 702/121 |
| 2005/0268285 | A1 | 12/2005 | Bagley et al. | |
| 2006/0205397 | A1* | 9/2006 | So | H04M 1/24 |
| | | | | 455/423 |
| 2008/0256517 | A1* | 10/2008 | Atkin | G06F 11/3688 |
| | | | | 717/124 |
| 2009/0043646 | A1* | 2/2009 | Pingali | G06F 11/3409 |
| | | | | 705/7.27 |
| 2010/0153087 | A1* | 6/2010 | Kirtkow | G06F 8/30 |
| | | | | 703/21 |
| 2010/0333072 | A1* | 12/2010 | Dulip | G06F 11/3419 |
| | | | | 717/128 |
| 2011/0004868 | A1 | 1/2011 | Bharadwaj | |
| 2011/0113287 | A1* | 5/2011 | Gururaj | G06F 11/0766 |
| | | | | 714/37 |
| 2011/0239104 | A1* | 9/2011 | Prasad | G06F 11/3684 |
| | | | | 715/234 |
| 2012/0023485 | A1* | 1/2012 | Dubey | G06F 8/30 |
| | | | | 717/125 |
| 2012/0144373 | A1 | 6/2012 | Cook | |
| 2013/0167116 | A1 | 6/2013 | Mahmud | |
| 2015/0081243 | A1* | 3/2015 | Ganai | G06F 11/3688 |
| | | | | 702/123 |
| 2015/0212927 | A1* | 7/2015 | N'Gum | G06F 11/368 |
| | | | | 717/125 |

OTHER PUBLICATIONS

Elbaum et al., Leveraging User-Session Data to Support Web Application Testing, publihsed by IEEE Transactions on Software Engineering, vol. 31, No. 3, Mar. 2005, pp. 187-202 (Year: 2005).*

Alsmadi et al., The Utilization of User Sessions in Testing, published by Seventh IEEE/ACIS International Conference on Computer and Information Science, pp. 581-585 (Year: 2008).*

Liu et al., "Capture-Replay Testing for Android Application", published by 2014 International Symposium on Computer, Consumer and Control, 2014 IEEE, pp. 1129-1132 (Year: 2014).*

Android Developers, "Optimize Your App," May 19, 2014, 6 pages, available at https://developer.android.com/distribute/essentials/optimizing-your-app.html.

Chandra, R. et al., "Towards Scalable Automated Mobile App Testing," (Research Paper), Jul. 8, 2014, 6 pages.

Ravindranath, L. et al., "Automatic and Scalable Fault Detection for Mobile Applications," (Research Paper), Jun. 16-19, 2014, 14 pages.

International Searching Authority., International Search Report and Written Opinion dated Apr. 29, 2016 for PCT Application No. PCT/US2015/043588 Filed Aug. 4, 2015, 13 pgs.

* cited by examiner

SELECTIVE APPLICATION TESTING

BACKGROUND

Applications are designed for use on many different types of computing devices, such as server computers, laptop computers, tablet computers, mobile phones, and wearable computing devices. Applications are often tested during and after development, e.g., for the purposes of identifying errors and potential improvements.

BRIEF DESCRIPTION OF THE DRAWINGS

The following detailed description references the drawings, wherein.

DETAILED DESCRIPTION

Monkey testing is one method for testing applications in a pseudo-random manner. Users may interact with applications in a variety of ways, and monkey testing generally seeks to simulate pseudo-random interactions with an application to test the manner in which the application responds. Monkey testing may be improved by using actual interactions with an application to be tested, which enables a tester to selectively simulate user actions based on the actual usage of the application. In addition, an entire user action flow, e.g., one or more actions performed by a user during the user's session with the application, may be simulated, rather than individual user actions. Configurable weights may, in some implementations, enable testers to test the portions of an application that are of interest, e.g., the most used, worst performing, and/or most error prone interactions with an application. Selectively testing actions on an application may increase the likelihood that tests are performed on the application features of interest and reduce the likelihood of wasting testing resources on application features that are not of interest. Application usage data may be periodically updated based on actual user interactions with the application and, as usage patterns change, the manner in which applications are tested may also change.

For example, for a particular application under test (AUT), user interactions with the application may be recorded and stored, e.g., in a database. The manner in which the user interactions are stored and/or organized may vary. For example, each user session, e.g., a period of time during which a user is interacting with the AUT, may be associated with an AUT state that defines the state of the AUT at a given point in time. The AUT state may define, for example, the current activity associated with a mobile application, e.g., the application component that provides a screen of the mobile application. User session data may also be used to generate and store a user action flow for the user session. A user action flow may include, for example, an ordered list of user actions performed during the user session and, for at least the first user action, the state of the AUT.

By way of example, a user action flow may specify that, during a previous user session, a user performed four actions, such as a combination of button presses, gestures, voice input, etc. The user action flow may specify the state of the AUT at the beginning of the user action flow and, in some implementations, the state of the AUT for each user action included in the flow. Other information related to each user action flow may also be stored, such as the length of time between a user action and the time the AUT becomes responsive again, or an indication of whether or not the AUT crashed or because otherwise unresponsive.

When testing the AUT, a testing device—the device performing simulated user actions to test the AUT—may request a user action flow from an advisor device. The advisor device may select one of the stored user action flows and provide the selected flow to the testing device. The manner in which the advisor device selects a user action flow may vary, e.g., the selection may be pseudo-random, based on the information related to the selected user action flow, and/or one user action at a time. The testing device, upon receipt of the selected user action flow, may simulate the user action(s) included in the flow on a device running the AUT. Further details regarding the selective testing of applications are provided in the paragraphs that follow.

Figure 1:
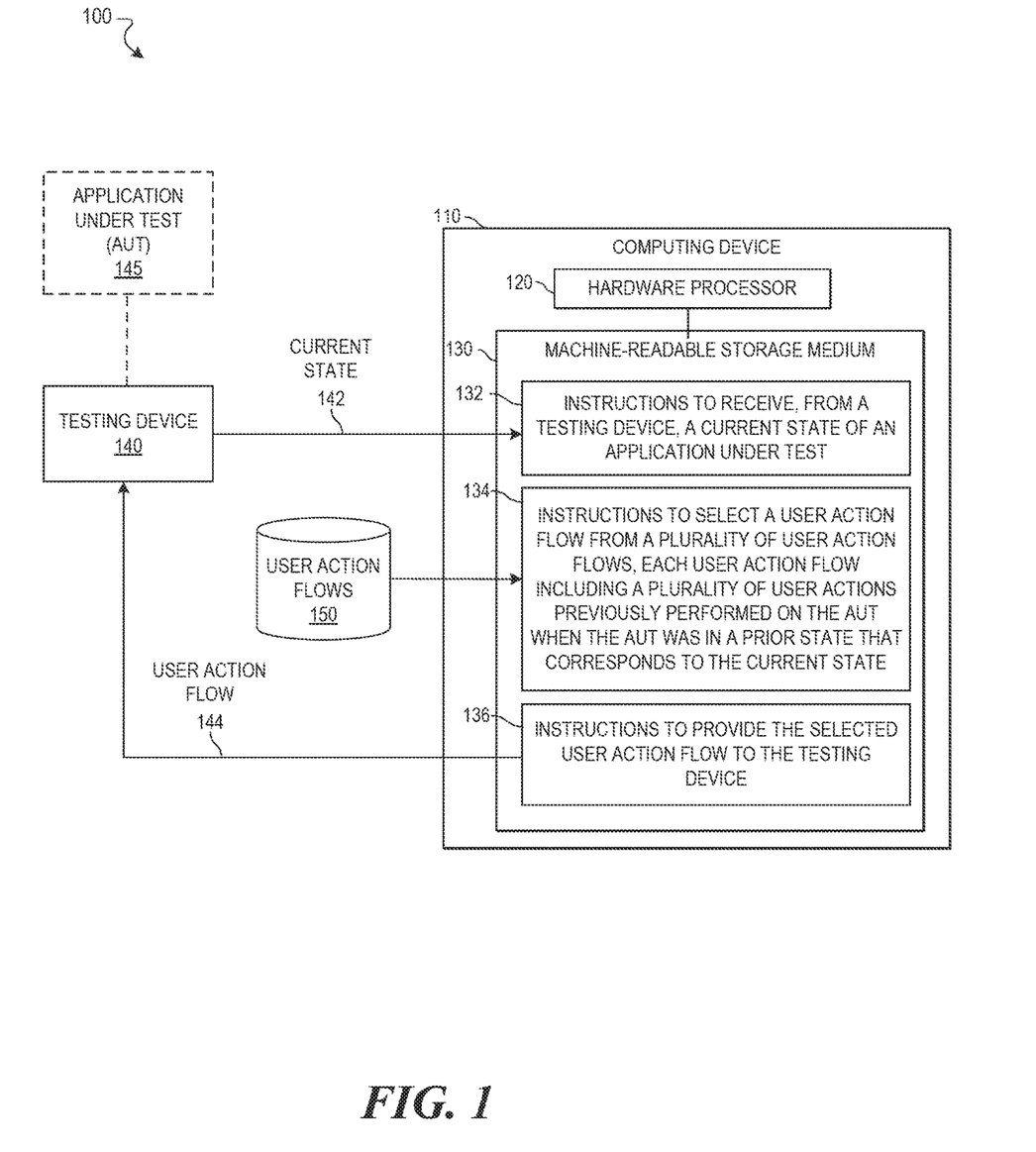
FIG. 1 is a block diagram of an example computing device for selectively testing applications.

Referring now to the drawings, FIG. 1 is a block diagram 100 of an example computing device 110 for selectively testing applications. Computing device 110 may be, for example, a server computer, a personal computer, a mobile computing device, or any other electronic device suitable for processing data. In the example implementation of FIG. 1, the computing device 110 includes a hardware processor, 120, and machine-readable storage medium, 130.

Hardware processor 120 may be one or more central processing units (CPUs), semiconductor-based microprocessors, and/or other hardware devices suitable for retrieval and execution of instructions stored in machine-readable storage medium, 130. Hardware processor 120 may fetch, decode, and execute instructions, such as 132-136, to control processes for selectively testing applications. As an alternative or in addition to retrieving and executing instructions, hardware processor 120 may include one or more electronic circuits that include electronic components for performing the functionality of one or more instructions.

A machine-readable storage medium, such as 130, may be any electronic, magnetic, optical, or other physical storage device that contains or stores executable instructions. Thus, machine-readable storage medium 130 may be, for example, Random Access Memory (RAM), an Electrically Erasable Programmable Read-Only Memory (EEPROM), a storage device, an optical disc, and the like. In some implementations, storage medium 130 may be a non-transitory storage medium, where the term "non-transitory" does not encompass transitory propagating signals. As described in detail below, machine-readable storage medium 130 may be encoded with a series of executable instructions: 132-136, for selectively testing applications.

As shown in FIG. 1 the computing device 110 receives, from a testing device 140, a current state 142 of an application under test 145 (132). The AUT 145 may be running on the testing device 140 or a separate device. The current state 142 includes a current foreground activity of the AUT 145, e.g., the current interface of the AUT 145.

The computing device 110 selects a user action flow from a plurality of user action flows 150 (134). In the example diagram, user action flows 150 are stored in a separate data storage device in communication with the computing device, though in some implementations they may be stored in the storage medium 130. Each user action flow includes multiple user actions previously performed on the AUT 145 when the AUT was in a prior state that corresponds to the current state 142. For example, the prior state may match the current state, e.g., in a manner designed to ensure that the user action flows from which one is selected are all flows that began when a previous user interacted with the AUT in the same state as is being tested. In some implementations, the user action flows 150 include ordered user actions, e.g., user actions that were previously performed on the AUT in a particular order by a particular user.

In some implementations, the selected user action flow 144 is randomly selected from the user action flows 150. Randomly may include, for example, pseudo-random methods of selection, e.g., based on seeded random selection routines and/or configurable weights, as described in further detail below. In some implementations, the computing device 110 selects a user action flow by obtaining, for each user action flow having a state that corresponds to the current state 142, a probability of selection that is based on at least one performance value associated with the user action flow and select the user action flow based on that probability of selection. The performance values may include, for example, a usage value that indicates a frequency at which a particular user action is performed, a response value indicating an AUT response time associate with a particular user action, and/or a stability value indicating a frequency at which the AUT becomes unstable in response to a particular user action. In some implementations, the performance values are associated with a configurable weight, and the probability of selection may be based on the configurable weight(s) associated with the performance value(s).

By way of example, a particular state of the AUT 145 may have two possible user actions. In situations where the first user action is chosen more frequently than the second user action in prior user action flows, the first user action may have a higher probability of selection. In situations where the first user action has a slower response time than the second user action, the first user action may have a higher probability of selection. In situations where the first user action is associated with a higher number of AUT crashes, the first user action may have a higher probability of selection. In implementations where performance values have configurable weights, each different type of performance factor may have a different effect on probability of selection. For example, a relatively high weight on the usage factor may generally result in more commonly performed user actions being tested more often than user actions with a relatively low usage rate.

User action flows, in some implementations, may include only one user action. While the above examples describe the selection of user actions and/or user action flows, the computing device may dynamically select user actions and/or user action flows throughout the testing process. For example, the performance values associated with the first user action of each user action flow may be used to select a user action flow to be tested. In some implementations, the performance values of each user action included in each user action flow are used to select a user action flow. In some implementations, a new user action is selected for each change in the state of the AUT 145.

After a user action flow 144 is selected, the computing device 110 provides the selected user action flow 144 to the testing device 140 (136). The testing device 140 may then use the selected user action flow 144 to test the AUT 145, e.g., by simulating the user action(s) included in the selected user action flow 144 on the AUT 145. As noted above, in some implementations only one user action is selected from a user action flow at a time. In this situation, the computing device 110 may receive an updated state, e.g., a state after the first provided user action is performed on the AUT 145, and select a second user action to be performed based on the updated state.

While the computing device 110 is shown separately from the testing device 140 and user action flows 150 storage device, in some implementations some or all of the actions performed by the various devices may be performed in a single computing device. For example, the computing device 110 may be in communication with an AUT device running the AUT 145, and the computing device may be responsible for both obtaining the current state 142 of the AUT 145 as well as performing the selected user action or user action flow on the AUT 145. Further details regarding the selective testing of applications are provided in with respect to FIGS. 2-4, below.

Figure 2:
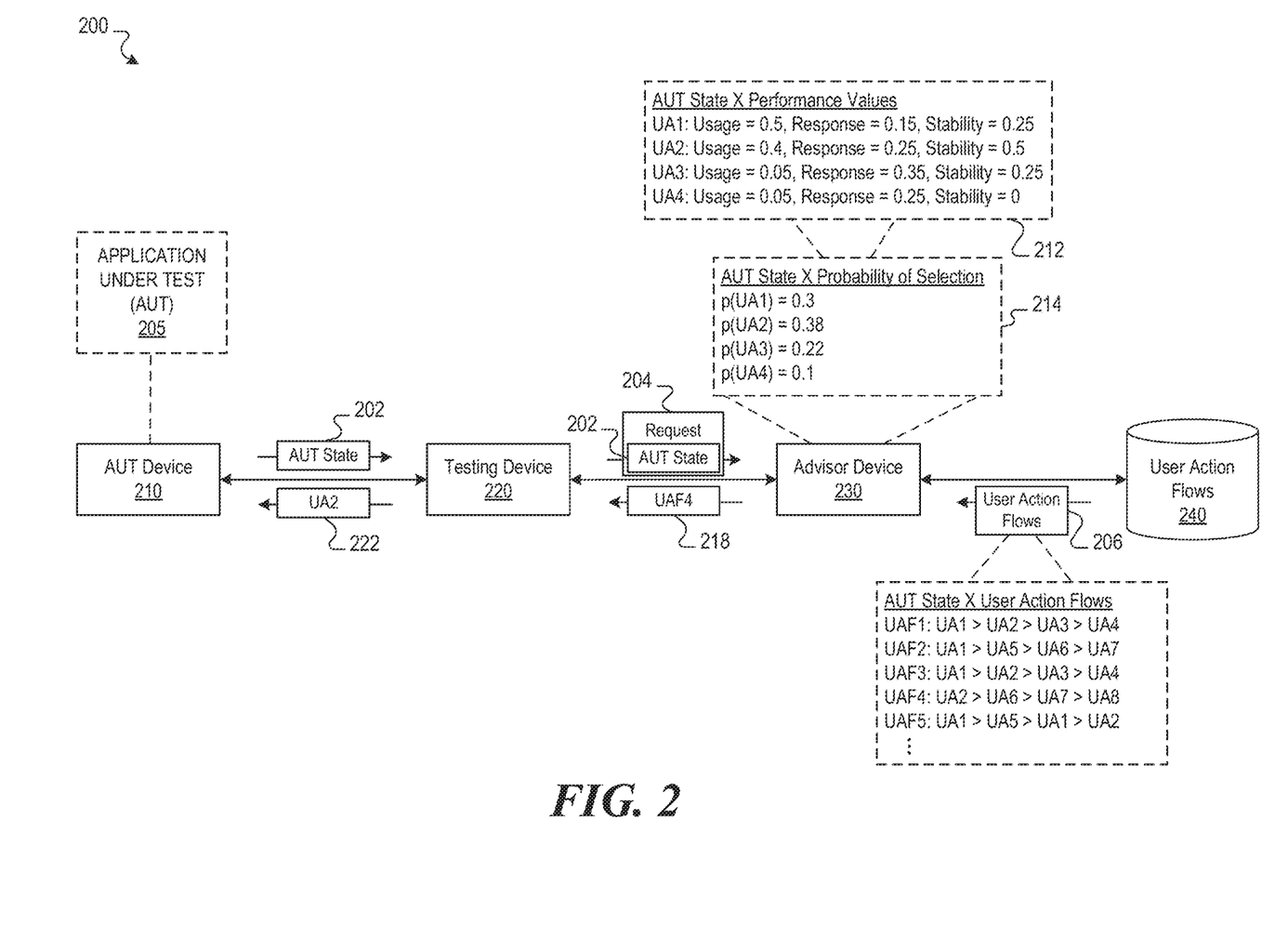
FIG. 2 is an example data flow for selectively testing applications.

FIG. 2 is an example data flow 200 for selectively testing applications. The data flow 200 depicts the selection of a user action to be performed on an AUT, such as the AUT depicted in the illustration of example user flows provided in FIG. 3. The data flow depicts an AUT device 210 on which the AUT is running, a testing device 220 for providing test instructions to the AUT device 210 and for obtaining test results, an advisor device 230 for facilitating the selection of user action(s) to be tested, and a user action flows 240 storage device for storing user action flows. As noted above, multiple device configurations may be used, e.g., some or all of the actions performed by the aforementioned devices may be performed by a single device or spread out among multiple devices performing actions in parallel.

The advisor device 230 identifies user action flows, such as user action flows 206, included in the user action flows 240 data storage device. Each of the user action flows includes at least one user action previously performed on the AUT 205. Each user action flow may also be associated with an AUT state, e.g., the state of the AUT at the time a previous user performed the first user action of the user action flow.

Figure 3:
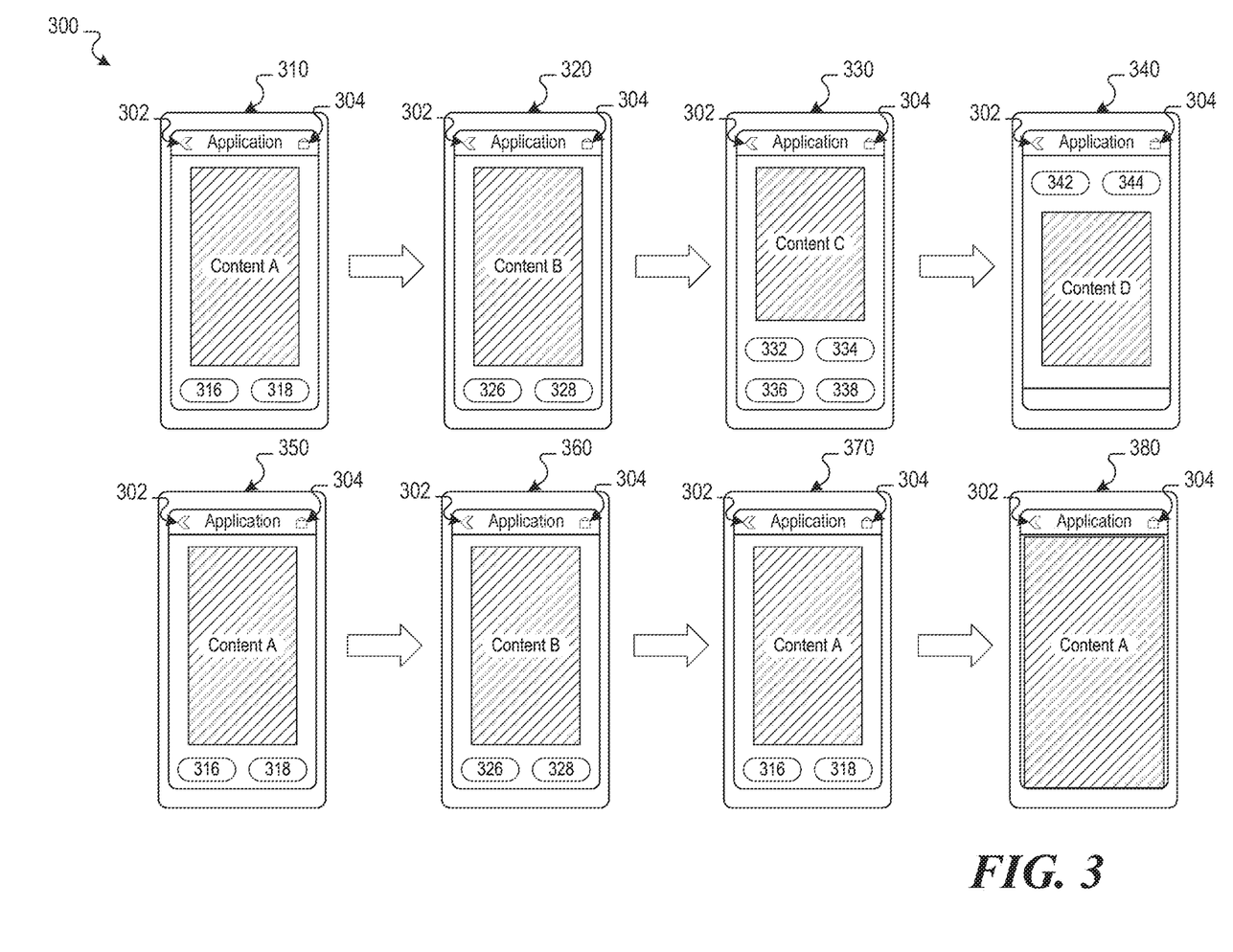
FIG. 3 is an illustration of example user action flows.

By way of example, the user action flows, UAF1 and UAF2, may correspond to the example action flows illustrated in FIG. 3, which depicts example user action flows being performed on an AUT that is running on a mobile computing device. For example, 310, 320, 330, and 340 may depict the state of the AUT prior to each action included in UAF1 while 350, 360, 370, and 380 may depict the state of the AUT prior to each action included in UAF2. As seen in the examples 300, both user action flows begin at the same state, e.g., 310 and 350 are the same. Four possible interactions are tracked with respect to this AUT state, e.g., interactions with virtual buttons 302, 304, 316, and 318. In this situation, user action UA1 may correspond to a user pressing button 316, UA2 may correspond to pressing button 318, UA3 may correspond to a user pressing button 302, and UA4 may correspond to a user pressing button 304. Accordingly, the first user action, UA1, of the user action flows, UAF1, UAF2, UAF3, and UAF5, is the pressing of button 316; while the first user action, UA2, of the user action flow, UAF4, is the pressing of button 318.

For each of the user action flows, the advisor device 230 may determine performance values. The performance values for a user action flow may be determined based on the performance values of a single user action, multiple user actions, and/or the entire user action flow. In the example data flow 200, the advisor determines performance values 212 for each of four user actions for a given state, state X.

The first example performance factor, usage, is a measure of frequency with which a particular user action is performed. In this example, the measure is relative, e.g., the example usage values indicate the distribution of user actions previously performed on the AUT 205 during state X, as recorded in previous user action flows, with UA1 being previously selected 50% of the time, UA2 being selected 40% of the time, and UA3 and UA4 being selected 5% of the time each.

The second example performance factor, response time, is a value indicating an average period of time between a previous users performance of a given user action and the time the AUT 205 became responsive again following the user action. In this example, the response time is relative, e.g., the example response time values indicate the distribution of average AUT response times. For example, UA1 has an average response that is 15% of the sum of average response times, UA2 has an average response that is 25% of the sum of average response times, UA3 has an average response that is 35% of the sum of average response times, and UA4 has an average response that is 25% of the sum of average response times.

The third example performance factor, stability, is a value indicating a number of AUT crashes that occurred in response to a previous user's performance of a given user action. In the example data flow, the value is a relative measure indicating the portion of crashes attributable to each user action. For example, UA1 and UA3 are each responsible for 25% of the crashes, UA2 is responsible for 50% of the crashes, and UA4 is responsible for no crashes.

While the example performance factors are relative, any combination of relative and/or absolute values may be used for performance factors. In some implementations, performance factors may be determined for a user action flow based on performance factors of at least one of the user actions included in the user action flow. For example, a user action flow may aggregate or use an average of the individual user action performance values. In some implementations the user action flow may use the performance values of the first user action only, the last user action only, or any combination of particular user actions.

The performance values determined for various user actions may be used to select user actions and/or user action flows for testing the AUT 205. In some implementations, each performance value is associated with a configurable weight, such that the impact of any individual performance factor on the likelihood of being selected for testing may be adjusted. Many options exist for configuring weights of performance factors. For example, in situations where a tester would prefer to test the more frequently used actions the most often, a weight for the usage performance factor may be higher than the weights for response time and stability. In situations where a tester would prefer to test user actions that cause crashes, a weight associated with the stability performance factor may be higher than the weights for response time and usage.

Given the performance values 212, and—in implementations where they are used—configurable weights, the advisor device 230 may determine, for each user action or user action flow, a probability of selection 214 with respect to a particular state. As described in further detail below, the probabilities of selection 214 may be used, for example, to determine which user action or user action flow is used when testing the AUT 205. The probabilities of selection may be determined in a variety of ways. In the example data flow, the probabilities 214 were calculated by aggregating the performance values for each user action and using, as the probability of selection, the portion of the total aggregate of all user action performance values. For example, the sum of UA1 performance values is 0.9 (0.5+0.15+0.25), the sum of UA2 performance values is 1.15 (0.4+0.25+0.5), the sum of UA3 performance values is 0.65 (0.05+0.35+0.25), and the sum of UA4 performance values is 0.3 (0.05+0.25+0). Dividing the sum of each user action's performance values by the sum of all user actions' performance values (3), results in (approximately) the example probabilities of selection 214: p(UA1)=0.3, p(UA2)=0.38, p(UA3)=0.22, and p(UA4)=0.1.

Using the example probabilities of selection 214, user action UA2 is the most likely user action to be selected for testing, followed by user action UA1, then user action UA3, and user action UA4. As indicated above, in implementations where configurable weights are used, the impact of individual performance factors on the probability of selection may be adjusted. For example, using a usage weight of 0.5 would reduce the impact of usage factor by half. Many variations on determining performance values and probabilities of selection may be used, and the values and probabilities may be periodically adjusted. For example, additional user action flows may be used to recalculate performance factors, enabling the performance factors to maintain relevance to more recent user activity patterns.

The example data flow depicts the use of the probabilities of selection 214 for selecting a user action flow to be tested on the AUT 205. The testing device 220 obtains an AUT state 202 from the AUT device 210. The AUT state specifies the current state, e.g., screen, interface, version number, or status, of the AUT 205. The testing device 220 provides the advisor device 230 with a request 204 that includes the AUT state 202, e.g., a request 204 for a user action or user action flow for testing the AUT 205.

The advisor device 230 identifies, from the user action flows 240, a set of user action flows 206 associated with the AUT state 202 included in the request. Each of the example user action flows 206 includes at least one user action previously performed on the AUT 205 when the AUT 205 was in the AUT state 202. For example, in a situation where the AUT state 202 is the home screen of a mobile application, each identified user action flow may be a previously recorded flow of user actions that began at the home screen of the mobile application. In the example data flow 200, the identified user action flows 206 include multiple previously recorded user action flows that began at the AUT state 202.

The advisor device 230 selects a particular user action flow 218, e.g., UAF4, from the set of user action flows 206 based on the performance values of the particular user action flow 218. As noted above, the manner in which the particular user action flow 218 is selected may vary. In some implementations, the user action flow 218 is selected pseudo-randomly, e.g., using a random number generator and the probabilities of selection 214 for the given state of the AUT 205. In situations where multiple tests will be performed on the AUT, the advisor device 230 may take steps to ensure a particular distribution of user action flows that are tested, e.g., a distribution that results in user action flows being selected based on the probabilities of selection.

In some implementations, the advisor device 230 may select an entire user action flow, e.g., UAF4. The selection may be made based on the first user action of UAF4, e.g., UA1, and/or the other user actions included in UAF4. In some implementations, the advisor device 230 may select a single user action, rather than an entire user action flow. In this situation, further selections of subsequent user actions may be based on the prior selections, e.g., each user action selected may be required to have been part of a user action flow having prior user actions that match the user actions performed during testing.

In the example data flow 200, the advisor device 230 has selected an entire user action flow 218, UAF4, to provide to the testing device 220. Upon receipt of the user action flow 218, the testing device 220 instructs the AUT device 210 to perform the first action 222, UA2, of the selected user action flow 218. In this example, the testing device 220 may continue to provide user actions from the selected user action flow 218 to the AUT device 210, e.g., for testing purposes. The information received or monitored by the testing device 220 may vary, e.g., AUT 205 response time, crash information, and updated state information.

In some implementations, the testing device 220 may receive updated AUT 205 state data from the AUT device 210 and provide the updated state data to the advisor device 230 to receive another user action or user action flow for further testing of the AUT 205. The example data flow 200 may be repeated on the same devices or different devices, e.g., for additional testing. While four separate devices are depicted in the example data flow 200, the functions of some or all of the separate devices may be combined into more or less than four devices. For example, the advisor device 230 and testing device 220 may be combined. The AUT device may be a virtualization of a hardware device capable of running the AUT. One advisor device may receive requests and provide user actions and/or user action flows for multiple testing devices at a time. Other system configurations for the devices described above may also be used.

Figure 4:
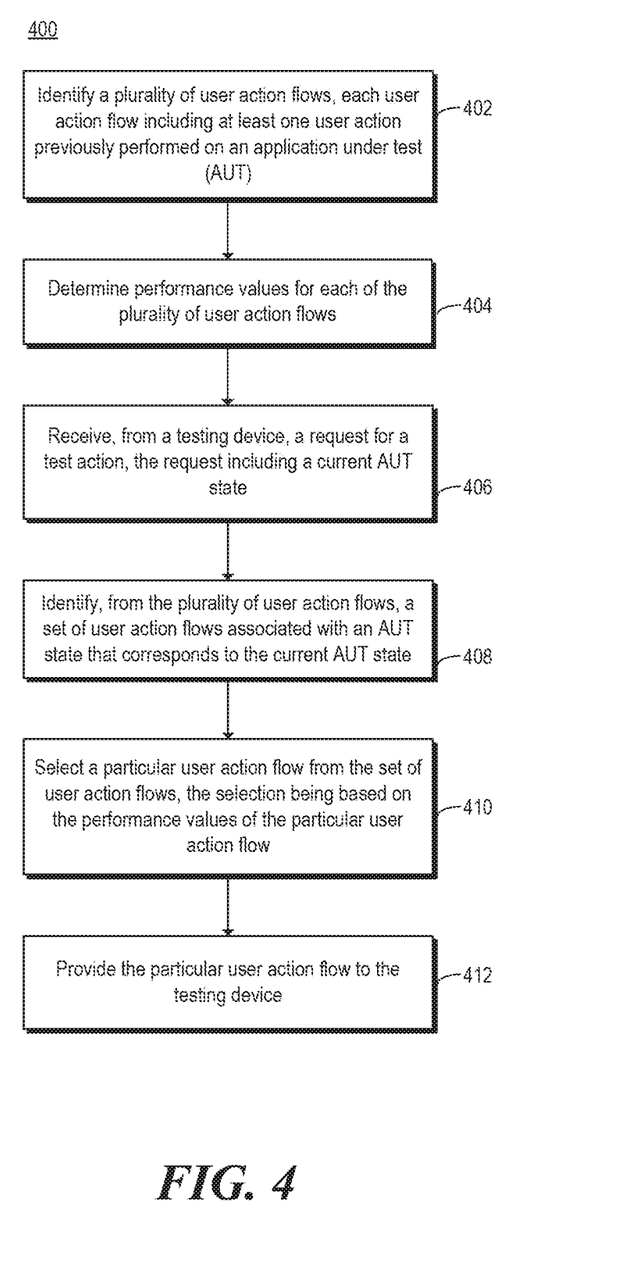
FIG. 4 is a flowchart of an example method for selectively testing applications.

FIG. 4 is a flowchart of an example method 400 for selectively testing applications. The method 400 may be performed by a computing device, such as a computing device described in FIG. 1. e.g., in the form of a server computer. Other computing devices may also be used to execute method 400. Method 400 may be implemented in the form of executable instructions stored on a machine-readable storage medium, such as the storage medium 130, and/or in the form of electronic circuitry.

User action flows are identified, each user action flow including at least one user action previously performed on an application under test (AUT) (402). For example, button presses, voice commands, gesture commands, and other user interactions may be recorded in an ordered list, along with the state of the application at the time the actions were performed. The state may specify a variety of information, such as the foreground activity of the application, the version of the application, and/or related software affecting the application.

Performance values are determined for each of the user action flows (404). As described above, performance values may be determined for one or more of the individual user actions of a user action flow and/or for the user action flow as a whole. Example performance values include a usage value indicating how often a particular user action is performed for a given AUT state, a response time value indicating how long it takes the AUT to become responsive after a given user action is performed on the AUT, and a stability value indicating a frequency at which the AUT becomes unstable, unresponsive, crashes, etc. The performance values, which may be used to determine which user actions are selected for testing, may—in some implementations—each be associated with a configurable weight, which may be used to adjust the impact a particular performance factor has on the selection of the user action or user action flow.

A request for a test action is received from a testing device, the request including a current AUT state (406). The testing device may be responsible for running tests, e.g., simulating user actions, on a device running the AUT. The state of the AUT provides an indication of which user actions or user action flows are eligible for performing on the AUT.

From the identified user action flows, a set of user action flows associated with an AUT state that corresponds to the current AUT state is identified (408). In some implementations, each user action flow included in the identified set may include a unique set of user actions, and data associated with each unique user action flow may indicate average and/or aggregate performance values for previous occurrences of the same user action flow. In some implementations, the identified set may include duplicate user action flows, each associated with its own performance values. In some implementations, only user action flows including a single user action that corresponds to the current AUT state are included in the identified set.

A particular user action flow is selected from the set of user action flows, the selection being based on the performance values of the particular user action flow (410). As described above with respect to FIG. 2, a particular user action flow may be selected in a variety of ways. In some implementations, selection may be random or pseudo-random. In some implementations, user preferences may be used to determine which user action flow is selected. The selection may include a single user action or a user action flow with multiple user actions. In some implementations, selection is based on the performance values determined for the user action flows and, in implementations where they are used, the configurable weights for the performance values. By way of example, each user action flow included in the set may be associated with a probability of selection, and a random number generator may be used to determine which particular user action flow is selected.

The particular user action flow is provided to the testing device (412). The entire user action flow, or in some implementations one user action of the flow at a time, may be provided to the testing device for testing the AUT. In some implementations, additional requests may be received by the testing device, which may result in different user actions or user action flows being selected for testing.

The foregoing disclosure describes a number of example implementations for selectively testing applications. As detailed above, examples provide a mechanism for selecting user actions with particular performance characteristics for testing an application.

We claim:

1. A non-transitory machine-readable storage medium encoded with instructions executable by a hardware processor of a computing device to cause the hardware processor to:

receive, from a testing device, a request for a user action flow to be tested on an application under test (AUT) that is running on an AUT device, wherein the request includes a current state of a screen or interface of the AUT running on the AUT device;

based on the current state of the screen or interface of the AUT in the request, identify, in a storage device, a plurality of previously recorded user action flows associated with an AUT state corresponding to the current state of the screen or interface of the AUT, wherein each of the previously recorded user action flows includes a unique set of user actions previously performed on the AUT;

determine a performance value for each of the previously recorded user action flows based on an average response time of the user actions in the previously recorded user action flow and a frequency at which each of the user actions was performed on the AUT;
determine a probability of selection for each of the previously recorded user action flows based on the performance value, wherein the probability of selection is a value indicating a level of likelihood that the previously recorded user action flow is to be selected for testing on the AUT;
select one of the previously recorded user action flows based on the probabilities of selection of the previously recorded user action flows; and
provide the selected previously recorded user action flow to the testing device for the testing device to simulate and test the user actions in the selected previously recorded user action flow on the AUT.

2. The non-transitory machine-readable storage medium of claim 1, wherein the user actions in each of the plurality of previously recorded user action flows were previously performed on the AUT in a particular order.

3. The non-transitory machine-readable storage medium of claim 1, wherein the performance value for each of the previously recorded user action flows is further determined based on an aggregate value of performance values of all of the user actions in the previously recorded user action flow.

4. The non-transitory machine-readable storage medium of claim 1, wherein the frequency at which each of the user actions was performed on the AUT is indicated by a usage value.

5. The non-transitory machine-readable storage medium of claim 1, wherein the performance value for each of the previously recorded user action flows is further determined based on a stability value indicating a frequency at which the AUT becomes unstable in response to the user actions in the previously recorded user action flow.

6. The non-transitory machine-readable storage medium of claim 1, wherein:
the performance value for each of the previously recorded user action flows is associated with a configurable weight, and
the probability of selection of each of the previously recorded user action flows is determined based on the configurable weight associated with the performance value for the previously recorded user action flow.

7. A method for selectively testing applications, implemented by a hardware processor, the method comprising:
receiving, from a testing device, a request for a user action flow to be tested on an application under test (AUT) running on an AUT device, the request including a current AUT state of a screen or interface of the AUT running on the AUT device;
based on the current AUT state of the screen or interface of the AUT in the request, identifying a plurality of previously recorded user action flows associated with an AUT state that corresponds to the current AUT state of the screen or interface of the AUT running on the AUT device, wherein each of the previously recorded user action flows includes a unique set of user actions previously performed on the AUT;
determine a performance value for each of the previously recorded user action flows based on an average response time of the user actions in the previously recorded user action flow and a frequency at which each of the user actions was performed on the AUT;
determining a probability of selection for each of the previously recorded user action flows based on the performance value, wherein the probability of selection is a value indicating a level of likelihood that the previously recorded user action flow is to be selected for testing on the AUT;
selecting one of the previously recorded user action flows based on the probability of selection of the user action flows; and
providing the selected previously recorded user action flow to the testing device for the testing device to simulate and test the user actions in the selected previously recorded user action flow on the AUT.

8. The method of claim 7, wherein the frequency at which each of the user actions was previously performed on the AUT is indicated by a usage value.

9. The method of claim 7, wherein determining the performance value for each of the previously recorded user action flows is further based on a stability value indicating a frequency at which the AUT became unstable in response to the user actions in the previously recorded user action flow.

10. The method of claim 9, wherein:
the performance value for each of the previously recorded user action flows is associated with a weight, and
selecting one of the previously recorded user action flows comprises selecting a particular user action flow based on the weight associated with the particular user action flow.

11. The method of claim 7, further comprising:
receiving additional user action flows; and
updating the performance value determined for each of the plurality of previously recorded user action flows based on user actions in the additional user action flows.

12. A computing device for selectively testing applications, the computing device comprising:
a hardware processor; and
a data storage device storing instructions that, when executed by the hardware processor, cause the hardware processor to:
receive, from a testing device, a request for a user action flow to be tested on an application under test (AUT) running on an AUT device, wherein the request includes a current state of a screen or interface of the AUT running on the AUT device;
identify, in a storage device, a plurality of previously recorded user action flows associated with an AUT state corresponding to the current state of the screen or interface of the AUT, wherein each of the previously recorded user action flows includes a unique set of user actions previously performed on the AUT;
determine a performance value for each of the previously recorded user action flows based on an average response time of the user actions in the previously recorded user action flow and a frequency at which each of the user actions was performed on the AUT;
determine a probability of selection for each of the previously recorded user action flows based on the performance value, wherein the probability of selection is a value indicating a level of likelihood that the previously recorded user action flow is to be selected for testing on the AUT;
select one of the previously recorded user action flows based on the probabilities of selection of the previously recorded user action flows; and
provide the selected previously recorded user action flow to the testing device the testing device to simulate and test the user actions in the selected previously recorded user action flow on the AUT.

13. The computing device of claim 12, wherein the current state of the screen or interface of the AUT includes a foreground activity on the screen or interface of the AUT.

14. The computing device of claim 13, wherein the request further includes an AUT version number.

15. The computing device of claim 12, wherein the user actions in each of the previously recorded user action flows were previously performed on the AUT in a particular order.

16. The computing device of claim 12, wherein the performance value for each of the previously recorded user action flows is further determined based on an aggregate value of performance values of all of the user actions in the previously recorded user action flow.

17. The computing device of claim 12, wherein the frequency at which each of the user actions was performed on the AUT is indicated by a usage value.

18. The computing device of claim 12, wherein the performance value for each of the previously recorded user action flows is further determined based on a stability value indicating a frequency at which the AUT becomes unstable in response to the user actions in the previously recorded user action flow.

19. The computing device of claim 12, wherein:
the performance value for each of the previously recorded user action flows is associated with a configurable weight, and
the probability of selection of each of the previously recorded user action flows is determined based on the configurable weight associated with the performance value for the previously recorded user action flow.

* * * * *